United States Patent [19]

Johnson et al.

[11] Patent Number: 4,503,292

[45] Date of Patent: Mar. 5, 1985

[54] CAMMED LATCHING SYSTEM FOR LOUDSPEAKER AND GRILLE

[75] Inventors: William K. Johnson, Fort Collins, Colo.; Jaime Ferrero, Chicago, Ill.

[73] Assignee: International Jensen Incorporated, Schiller Park, Ill.

[21] Appl. No.: 435,086

[22] Filed: Oct. 18, 1982

[51] Int. Cl.[3] .................... H04N 1/02

[52] U.S. Cl. .................... 179/178; 179/146 R; 403/348; 403/406

[58] Field of Search .................... 403/348, 349, 406, 353; 248/27.1, 27.3; 179/178, 146 R, 146 E; 381/87, 88, 89, 90, 86; 455/350; 181/148, 150, 199; 200/296; 361/331

[56] References Cited

U.S. PATENT DOCUMENTS

| | | | |
|---|---|---|---|
| 3,561,068 | 2/1971 | Croxson | 248/27.3 |
| 4,247,219 | 1/1981 | Ausprung | 403/406 |
| 4,281,224 | 7/1981 | Castagna | 179/146 R |
| 4,327,264 | 4/1982 | Botz et al. | 200/296 |
| 4,359,133 | 11/1982 | Krolak | 181/148 |

FOREIGN PATENT DOCUMENTS

| | | | |
|---|---|---|---|
| 2834238 | 2/1980 | Fed. Rep. of Germany | 181/148 |
| 2920836 | 11/1980 | Fed. Rep. of Germany | 248/27.1 |
| 1236806 | 6/1960 | France | 403/381 |

*Primary Examiner*—Gene Z. Rubinson
*Assistant Examiner*—Danita R. Byrd
*Attorney, Agent, or Firm*—Willian Brinks Olds Hofer Gilson & Lione Ltd.

[57] ABSTRACT

A system for releasably attaching the grille of a loudspeaker directly to the rim of the loudspeaker. The system includes a plurality of latch members in the form of posts extending from the grille, each of the posts having an indentation including a cam and a plurality of latch-engaging portions located in the rim of the loudspeaker in registration with the posts. The latch-engaging portions each include an aperture shaped for penetration by the corresponding post. Locking means comprising a longitudinal slot and a cam receiver juxtaposed the slot is shaped to engage the indentation and cam and extends laterally from each aperture. The cam and cam receiver are correspondingly shaped such that less force is required to engage the cam and cam receiver then is required to disengage the same.

20 Claims, 9 Drawing Figures

Fig.1
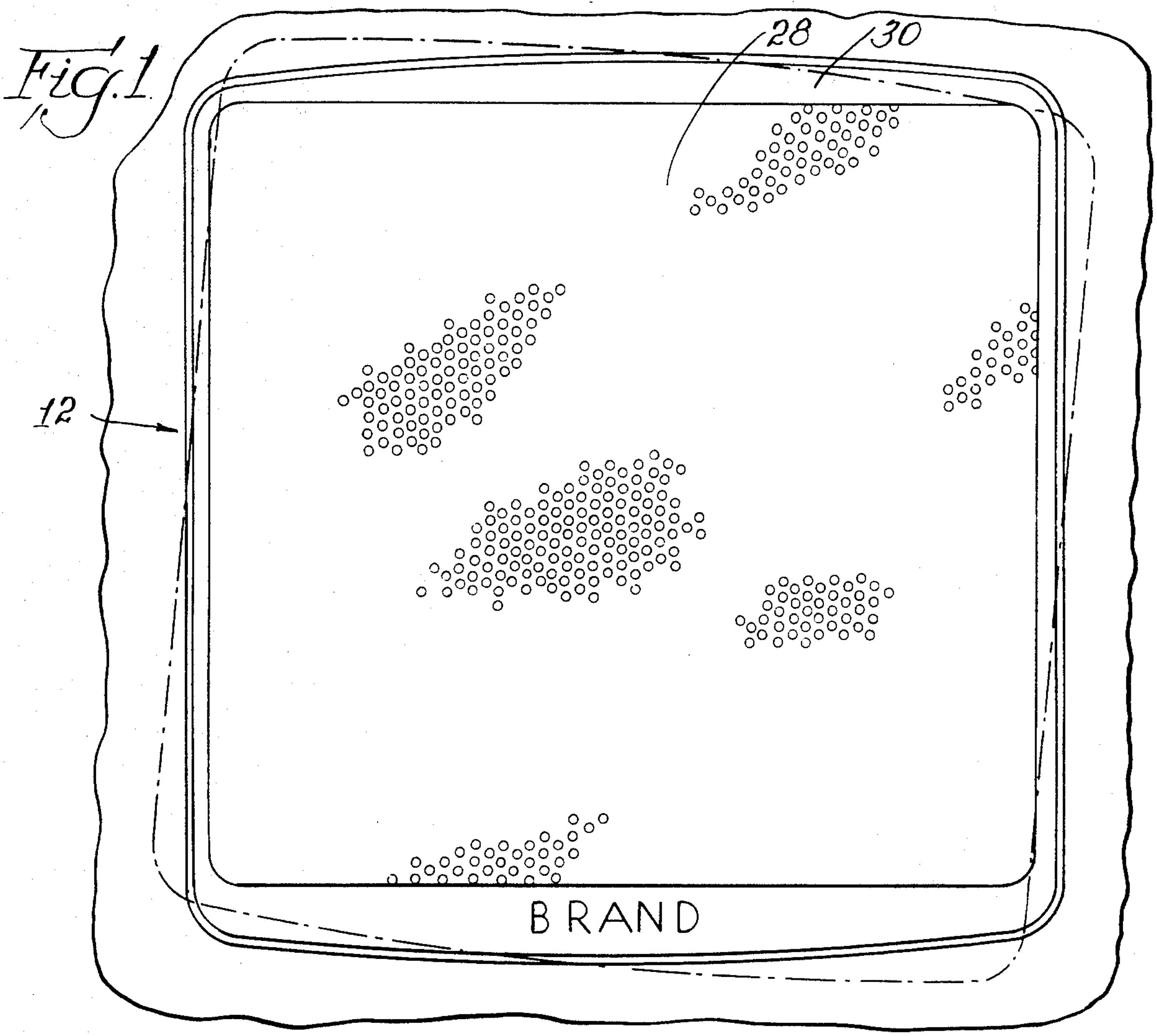
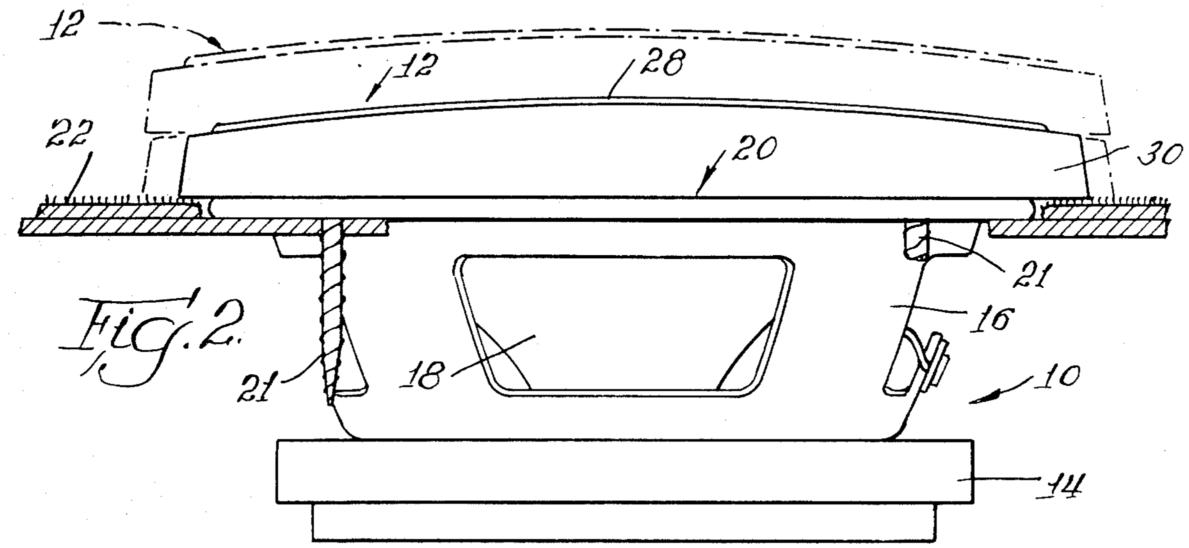
Fig.2

CAMMED LATCHING SYSTEM FOR LOUDSPEAKER AND GRILLE

BACKGROUND OF THE INVENTION

This invention relates to loudspeakers, and in particular to a system for releasably but securely attaching a grille to a loudspeaker.

Many lousdpeakers, particularly those installed in automobiles, include a decorative grille which overlies the speaker both for aesthetic purposes and to protect the speaker from damage. Since such speakers are normally installed in the existing surroundings, the speaker grille is attached directly to the loudspeaker after the loudspeaker is installed. While there are many manners of attaching the grille to the loudspeaker, such as by adhesives or by screwing the grille to the loudspeaker, permanent installation of the grille on the loudspeaker inhibits maintenance of the loudspeaker, while screwing the grille to the loudspeaker detracts from the appearance of the grille.

SUMMARY OF THE INVENTION

The invention pertains to a system for releasably attaching the grille of a loudspeaker to the loudspeaker. It includes at least one latch member extending from either the loudspeaker or the grille, the latch member having a lock receiving means shaped therein. A latch-engaging portion in the other of the loudspeaker or grille includes an aperture for receipt of the latch member. The latch-engaging portion has locking means shaped therein to engage the lock receiving means. The locking means and lock receiving means include means for connecting the latch member to the latch-engaging portion such that less force is required to engage the locking means and lock receiving means than is required to disengage the same.

Preferrably, the latch member comprises a post, and the lock receiving means comprises an indentation in the post including a cam therein. The cam has first and second oppositely inclined camming surfaces, one of the camming surfaces being inclined at a greater pitch than the other of the camming surfaces.

The locking means comprises a longitudinal slot extending laterally from the aperture and a cam receiver juxtaposed the slot. The cam receiver has first and second oppositely inclined cam engaging surfaces, one of the cam engaging surfaces being inclined at a greater pitch than the other of the cam engaging surfaces.

The pitches of the camming surfaces of the cam and cam engaging surfaces of the cam receiver are equal and correspond so that the cam is engaged within the cam receiver when the grille is attached to the loudspeaker. The corresponding inclinations and arrangement of the inclined surfaces of the cam and cam receiver result in less force being required to engage the locking means and lock receiving means than is required to disengage them.

The post of each latch member is resilient in order to permit camming action of the cam upon the cam receiver as the grille is installed on the loudspeaker. The grille is therefore secured to the loudspeaker in a snap-lock fashion when the cam is fully engaged in the cam receiver.

In the preferred embodiment, four of the latch members and corresponding latch engaging portions are used. The latch members extend from the grille and the latch-engaging portions are located in the frame of the loudspeaker in registration with the latch members. The grille is installed by locating the latch member above the corresponding latch-engaging portions, penetrating the apertures with the posts, and then rotating the grille about center to engage the cams and cam receivers.

BRIEF DESCRIPTION OF THE DRAWINGS

The invention is set forth in greater detail in the following description of the preferred embodiment, taken in conjunction with the drawings, in which:

FIG. 1 is a top plan view of a speaker grille with the installation/removal position illustrated in phantom, FIG. 2 is a side elevational illustration of an installed loudspeaker and grille according to the invention, showng the steps of installation or removal of the grille in phantom.

DESCRIPTION OF THE PREFERRED EMBODIMENT

Figure 3:
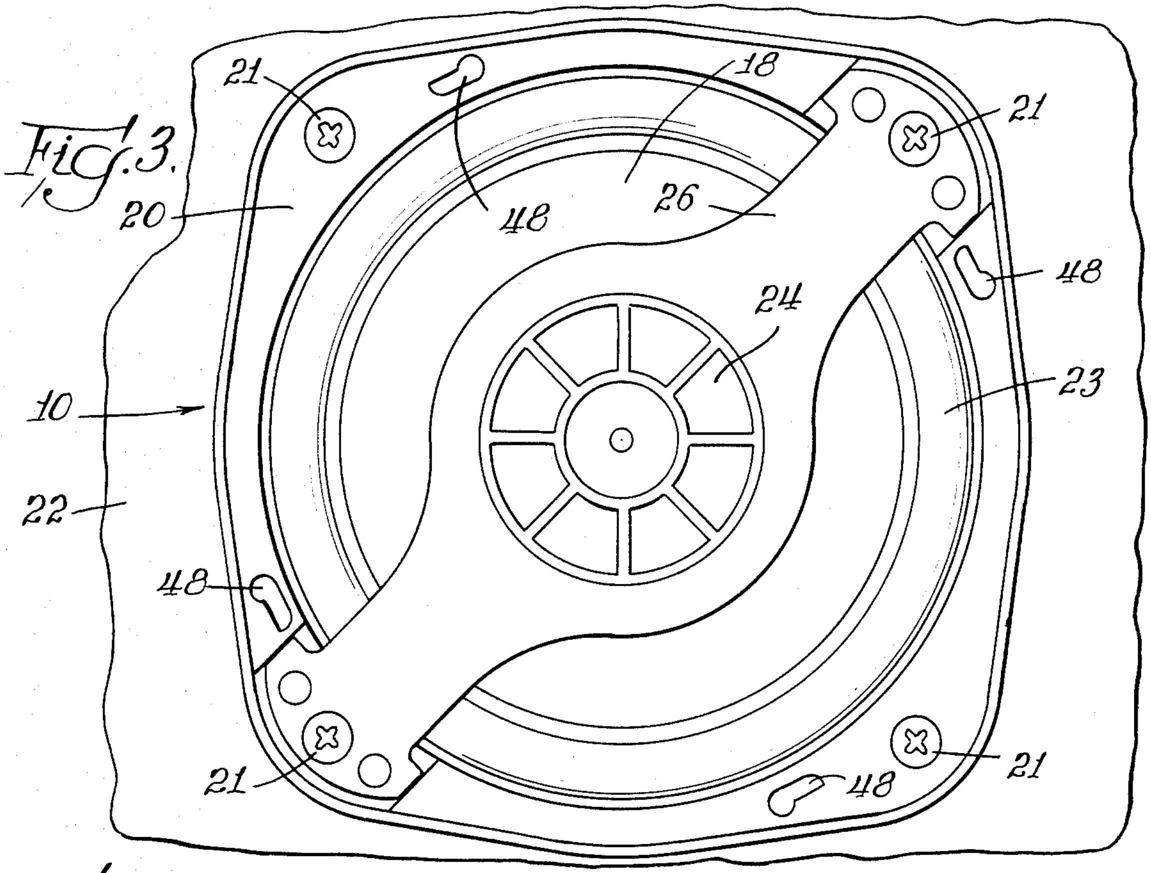
FIG. 3 is a top plan illustration of a loudspeaker according to the invention with the grille removed.

A loudspeaker 10 and grille 12 according to the invention are shown in FIGS. 1 through 4. The loudspeaker 10 may be of conventional design and includes, as primary components, a magnet 14, support basket 16, speaker cone 18 and rim 20. A series of fasteners 21 pass through apertures in the rim 20 and support basket 16 to attach the speaker to the surrounding structure 22, such as an automobile door, in which the loudspeaker 10 is installed.

As best shown in FIG. 3, the cone 18 is suspended from the frame 20 by means of a flexible surround 23 which permits axial excursion of the cone 18 when excited by a source of electrical sound impulses (not illustrated). Also illustrated in FIG. 3 is a smaller, coaxial loudspeaker 24 suspended above the cone 18 in a bracket 26 attached to the frame 20. The loudspeaker combination shown in FIG. 3 is a graphical depiction of the Jensen Coax II sold by the Jensen Sound Laboratories Division of International Jensen Incorporated. It will be evident that other loudspeakers can be employed as well when practicing the invention.

The grille 12 is composed of a perforated grille fabric 28 extending between the inner margins of a frame 30. The grille fabric 28 can be any suitable material, such as metal or plastic. Since only that portion of the grille immediately above the cone 18 need be free for passage of sound, the grille 12 also includes a plate 32 affixed to the frame 30 and having an internal aperture 34 which permits through passage of sound emanating from the loudspeaker 10.

Figure 4:
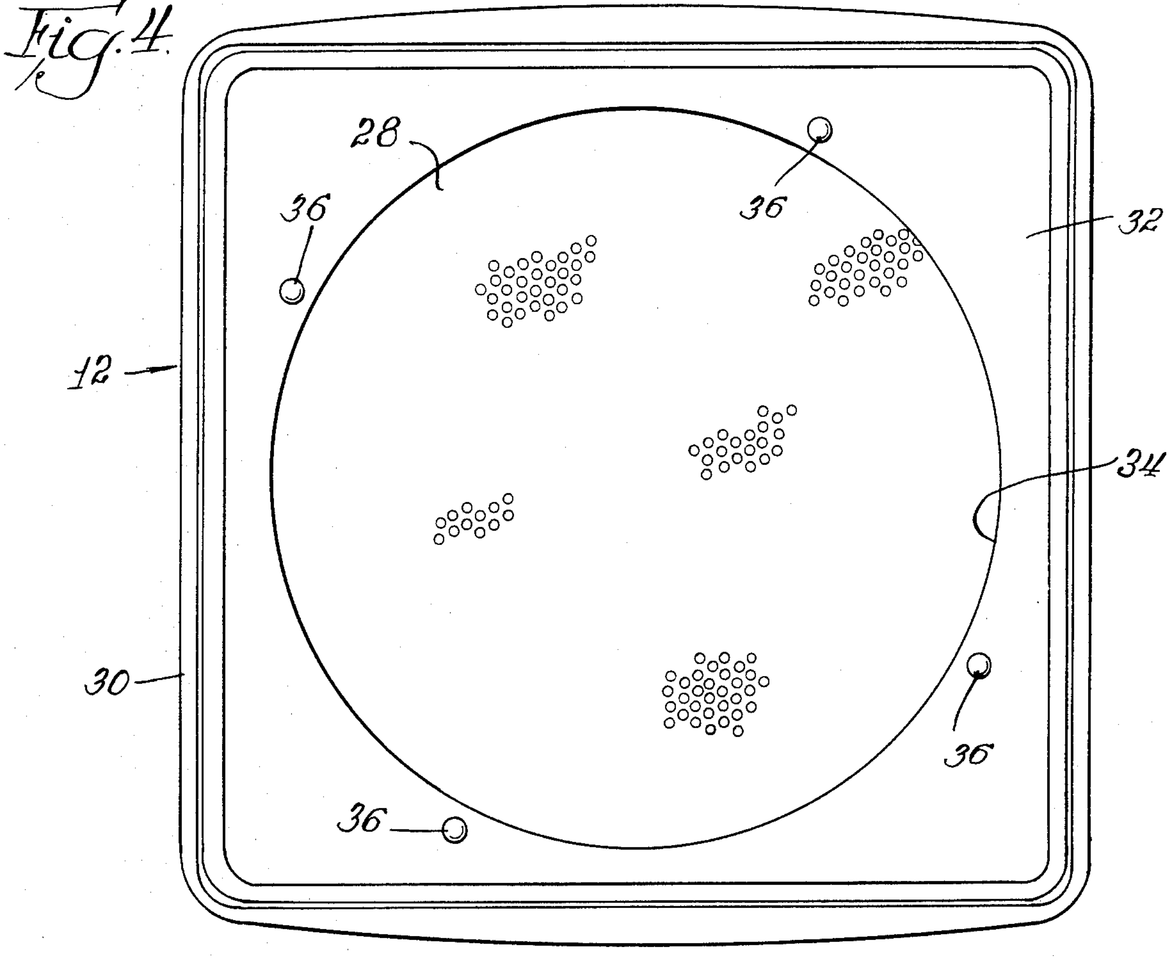
FIG. 4 is a bottom illustration of the inside of the grille.
Figure 8:
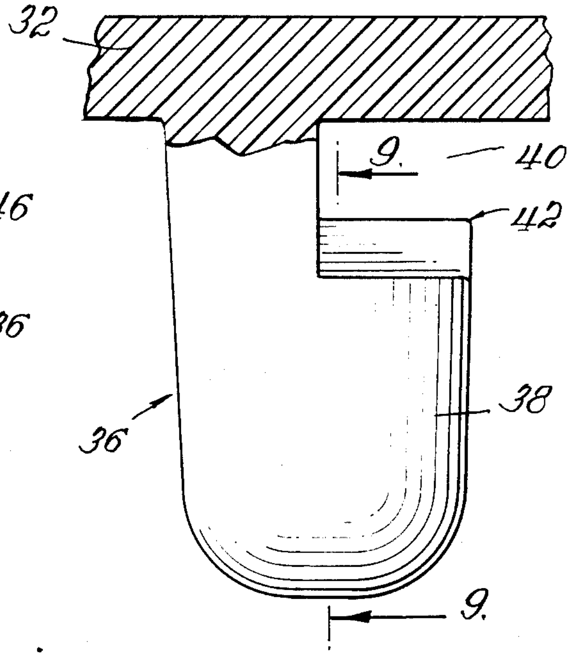
FIG. 8 is a partial cross-sectional illustration of the latch member which is received within the latch-engaging portion shown in FIGS. 5 through 7.
Figure 9:
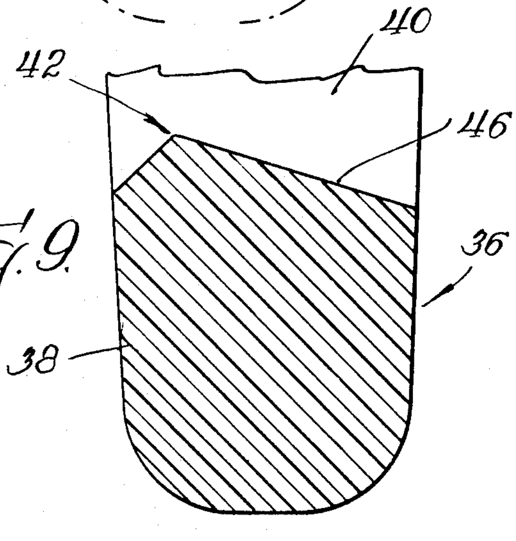
FIG. 9 is a cross-sectional illustration taken along lines 9—9 of FIG. 8.

The grille 12 is releasably attached to the loudspeaker 10. As shown in FIG. 4, and in greatly enlarged fashion in FIGS. 8 and 9, a series of latch members 36 extend from the plate 32 of the grille 12. The latch members are spaced periodically about the internal aperture 34, and each is composed of a post 38 having a lock receiving indentation or mouth 40 shaped therein.

The base of each indentation 40 comprises a cam 42. The cam 42 in turn has first and second oppositely inclined camming surfaces 44 and 46, the camming surface 44 being inclined at a greater pitch than the camming surface 46 for reasons described below.

Figure 5:
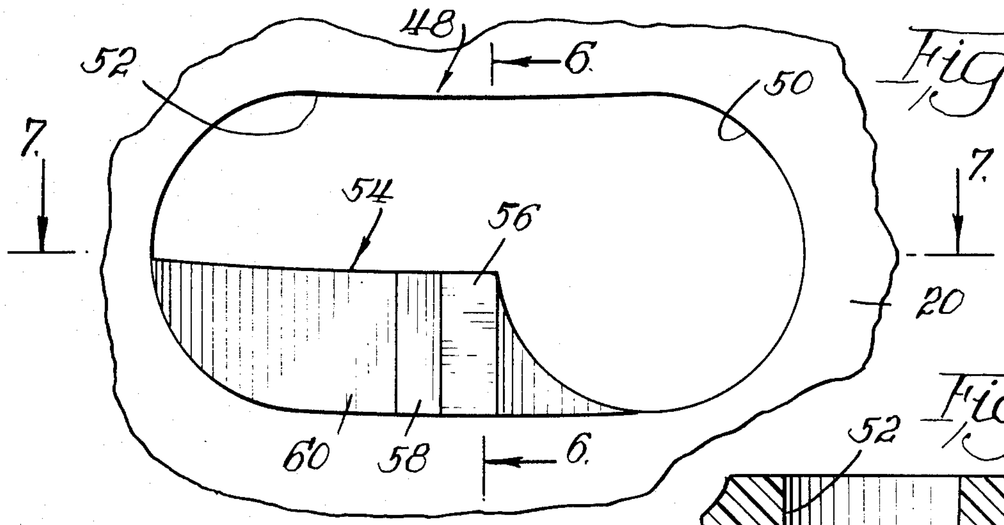
FIG. 5 is a greatly enlarged bottom view of the latch-engaging portion of the invention, showing the cam receiver.
Figure 6:
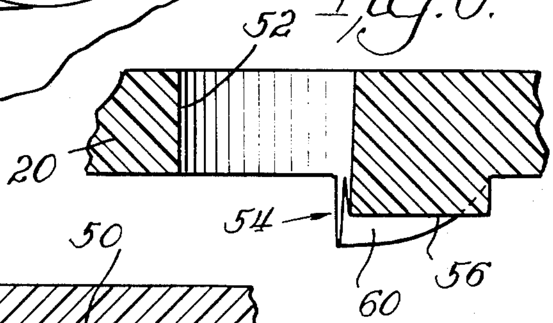
FIG. 6 is a cross-sectional illustration taken along lines 6—6 of FIG. 5.

A plurality of latach-engaging portions 48 are located in the frame 20 of the loudspeaker 10. As better shown in FIGS. 5 through 7, each of the latch-engaging portions 48 includes an aperture 50 for receipt and penetration of a corresponding latch member 36. The latch-engaging portion 48 also includes locking means shaped to engage the lock receiving indentations 40, the locking means comprising a longitudinal slot 52 extending laterally from the aperture 50 and a cam receiver 54 juxtaposed the slot 52.

Figure 7:
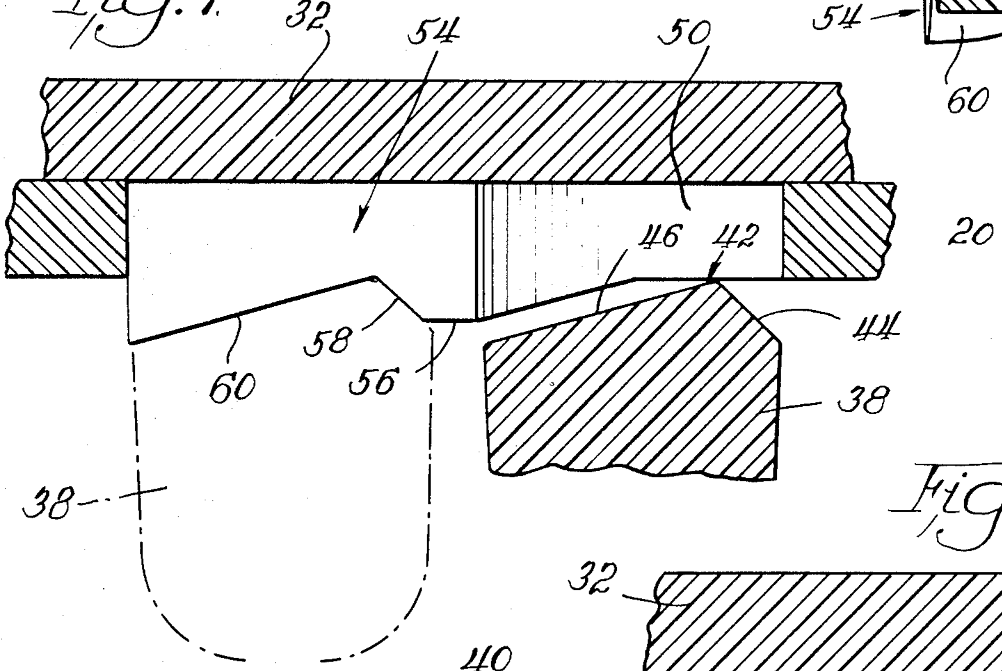
FIG. 7 is a cross-sectional illustration taken along lines 7—7 of FIG. 5, including illustration of a portion of the latch member when initially inserted through the aperture in the latch-engaging portion, and illustrated further in phantom in the latched position.

As best shown in FIG. 7, the cam receiver 54 includes a cam entry 56 and oppositely inclined cam engaging surfaces 58 and 60. The cam engaging surface 58 is inclined at a greater pitch than that of the cam engaging surface 60 and, as shown in FIG. 7, the surfaces 58 and 60 are inclined at approximately equal and corresponding pitches to the surfaces 44 and 46 of the cam 42.

The cam 42 and cam receiver 54 interengage in a snap-lock fashion to securely attach the grille 12 to the loudspeaker 10. As shown in FIGS. 1, 2 and 7 to install the grille 12, the grille is situated over the loudspeaker 10 with the posts 38 aligned with the apertures 50. The grille 12 is then engaged on the loudspeaker 10 so that the posts 38 penetrate the apertures 50 to the extent as shown in bold fashion in FIG. 7. The grille 12, which is slightly askew the loudspeaker 10 as shown in phantom in FIG. 1, is then rotated so that the cams 42 begin entry into the cam receiver 54. Since the posts 38 are preferrably made of a resilient material such as plastic, the resiliency of the plastic permits expension of the indentation 40 as the camming surface 42 rides against the cam entry 56. Again as best shown in FIG. 7, during this procedure, the camming surface 46 bears against the cam entry 56 until the apex of the cam 42 is reached. As rotation continues, the cam 42 then fully enters the cam receiver 54 and seats within the cam receiver in a snap-lock fashion as shown in phantom in FIG. 7.

Because of the inclination of the camming surface 46 and cam engaging surface 60 are substantially less than the inclinations of the camming surface 44 and cam engaging surface 58, less force is required to engage the cam 42 within the cam receiver 54 than is required to disengage the cam and cam receiver. Therefore, although the grille 12 can thus rather simply be inserted onto the loudspeaker 10, removal of the grille 12 requires greater effort, thus helping to insure that the grille 12 is not inadvertently loosened and knocked from the loudspeaker 10.

It will be apparent that although the preferred embodiment illustrated has four latch members 36 and corresponding latch-engaging portions 48, any number of latch members 36 and latch-engaging portions 48 can be employed as required by the dimensions of the loudspeaker 10, and the security with which the grille 12 is to be fastened to the loudspeaker 10. It is also apparent that although the latch members 36 have been illustrated as extending integrally from the plate 32 of the grille 12, the latch members 36 can otherwise be affixed to the plate 32, such as by an adhesive. Also, the positions of the latch members 36 and latch-engaging portions 48 can be interchanged, so that the latch members 36 extend from the frame 20 and the latch-engaging portions 48 are formed in the plate 32.

Various changes may be made to the invention without departing from the spirit thereof or scope of the following claims.

What is claimed is:

1. A loudspeaker assembly comprising:

a. a loudspeaker, said loudspeaker comprising at least one mounting surface adapted to mount the loudspeakers to a mounting panel b. a loudspeaker grille;

c. at least one latch member extending from one of said loudspeaker and said grille, said latch member comprising a lock receiving means shaped therein, d. a latch-engaging portion in the other of said loudspeaker and said grille, said latch-engaging portion comprising an aperture shaped to receive said latch member and to accommodate translation of said latch member within said aperture and a locking means shaped to engage said lock receiving means, said aperture cooperating with said locking means and lock receiving means to guide translation of said lock receiving means during attachment and disattachment of said grille and loudspeaker;

e. said locking means and said lock receiving means comprising means for connecting said latch member to said latch-engaging portion, said locking means and said lock receiving means cooperating to attach said grille to said loudspeaker and to disattach said grille from said loudspeaker in response to forces applied to said grille substantially in a plane parallel to said loudspeaker mounting surface, said locking means and said lock receiving means further cooperating to require less force to engage said locking means and said lock receiving means than to disengage said locking means and said lock receiving means.

2. A system according to claim 1 in which said latch member comprises a post, and said lock receiving means comprises an indentation in said post including a cam.

3. A system according to claim 2 in which said cam comprises first and second oppositely inclined camming surfaces, one of said camming surfaces being inclined at a greater pitch than the other of said camming surfaces.

4. A system according to claim 2 in which said post is resilient.

5. A system according to claim 1 in which said lock receiving means comprises an indentation in said latch member comprising a cam, and said locking means comprises a longitudinal slot and a cam receiver in engaging alignment with said indentation when said latch member is received in said aperture.

6. A system according to claim 5 in which said cam comprises first and second oppositely inclined camming surfaces and said cam receiver has corresponding first and second oppositely inclined cam engaging surfaces, one of each of said first and second surfaces being inclined at a greater pitch than the other of each of said surfaces, said cam and said cam receiver comprising said connecting means.

7. A system according to claim 1 comprising four of said latch members and four of said latch-engaging portions.

8. A system according to claim 7 wherein said latch members are fixedly mounted to one of said loudspeaker and said grille, wherein said latch-engaging portions are fixedly mounted to the other of said loudspeaker and said grille, and wherein said latch members engage said latch-engaging portions simultaneously during attachment of said grille to said loudspeakers and said latch members disengage said latch-engaging portions simultaneously during disattachment of said grille from said loudspeaker.

9. A system according to claim 1 in which said latch member is attached to said grille and said latch-engaging portion is located in said loudspeaker.

10. A system according to claim 1 in which said aperture cooperates with said locking means and said lock receiving means to attach and disattach said grille to said loudspeaker by sliding said grille in a plane parallel to said loudspeaker mounting surface.

11. A system according to claim 1 comprising a plurality of said latch members and a plurality of said latch-engaging portions, said apertures cooperating with said locking means and said lock receiving means to attach and disattach said grille to said loudspeaker by rotating said grille about an axis intermediate said plurality of locking means.

12. A loudspeaker assembly comprising:

a. a loudspeaker;

b. a loudspeaker grille;

c. at least one latch member extending from one of said loudspeaker and said grille, said latch member comprising a lock receiving means shaped therein;

d. a latch-engaging portion in the other of said loudspeaker and said grille, said latch-engaging portion comprising an aperture for receipt of said latch member, a locking means extending from said aperture and comprising a longitudinal slot and a cam receiver juxtaposed said slot, said cam receiver shaped to engage said lock receiving means, and e. said locking means and said lock receiving means comprising a means for connecting said latch member to said latch-engaging portion, said locking means and said lock receiving means cooperating to require less force to engage said locking means and said lock receiving means than is required to disengage said locking means and said lock receiving means.

13. A system according to claim 12 in which said cam receiver comprises first and second oppositely inclined cam engaging surfaces, one of said cam engaging surfaces being inclined at a greater pitch than the other of said cam engaging surfaces.

14. A system according to claim 12 in which said aperture cooperates with said locking means and said lock receiving means to attach and disattach said grille to said loudspeaker by sliding said grille in a plane parallel to said loudspeaker mounting surface.

15. A system according to claim 12 comprising a plurality of said latch members and a plurality of said latch-engaging portions, said apertures cooperating with said locking means and said lock receiving means to attach and disattach said grille to said loudspeaker by rotating said grille about an axis intermediate said plurality of locking means.

16. A loudspeaker assembly comprising:

a. a loudspeaker comprising a frame;

b. a loudspeaker grille;

c. a plurality of latch members extending from said grille, each said latch member comprising a post having an indentation therein comprising a cam, d. a plurality of latch-engaging portions located in the frame of said loudspeaker in registration with said posts, each said latch-engaging portion comprising an aperture shaped for penetration by a respective one of said posts, e. locking means in each said latch engaging portion shaped to engage said indentation and cam, said locking means comprising a longitudinal slot extending laterally from said aperture and a cam receiver juxtaposed said slot, and f. said cam and cam receiver being shaped such that less force is required to engage said cam and cam receiver than is required to disengage said cam and cam receiver.

17. A system according to claim 16 in which said cam comprises first and second oppositely inclined camming surfaces and said cam receiver comprises corresponding first and second oppositely inclined cam engaging surfaces, one of each of said first and second surfaces being inclined at a greater pitch than the other of each of said surfaces.

18. A system according to claim 16 in which said apertures cooperate with respective aligned ones of said locking means and said lock receiving means to attach and disattach said grille to said loudspeaker by sliding said grille in a plane parallel to said loudspeaker mounting surface.

19. A system according to claim 16 in which said apertures cooperates with said locking means and said lock receiving means to attach and disattach said grille to said loudspeaker by rotating said grille about an axis intermediate said plurality of locking means.

20. A system according to claim 16 wherein said latch members are fixedly mounted to one of said loudspeaker and said grille, wherein said latch-engaging portions are fixedly mounted to the other of said loudspeaker and said grille, and wherein said latch members engage said latch-engaging portions simultaneously during attachment of said grille to said loudspeaker and said latch members disengage said latch-engaging portions simultaneously during disattachment of said grille from said loudspeaker.

* * * * *